(12) United States Patent
Loiseau et al.

(10) Patent No.: US 11,578,729 B2
(45) Date of Patent: Feb. 14, 2023

(54) ROTOR FOR TURBINE ENGINE AND TURBINE ENGINE COMPRISING THIS ROTOR

(71) Applicant: ARIANEGROUP SAS, Paris (FR)

(72) Inventors: Cyril Bernard Loiseau, Blaru (FR); Alexandre Michel Stéphane Brial, Saint Marcel (FR); Sébastien Boufflert, Louviers (FR); François André Adrien Moser, Lery (FR)

(73) Assignee: ARIANEGROUP SAS, Paris (FR)

( * ) Notice: Subject to any disclaimer, the term of this patent is extended or adjusted under 35 U.S.C. 154(b) by 425 days.

(21) Appl. No.: 16/970,662

(22) PCT Filed: Feb. 12, 2019

(86) PCT No.: PCT/FR2019/050297
§ 371 (c)(1),
(2) Date: Aug. 18, 2020

(87) PCT Pub. No.: WO2019/162593
PCT Pub. Date: Aug. 29, 2019

(65) Prior Publication Data
US 2020/0378400 A1 Dec. 3, 2020

(30) Foreign Application Priority Data
Feb. 20, 2018 (FR) ...................................... 1851432

(51) Int. Cl.
*F04D 29/38* (2006.01)
*F04D 13/04* (2006.01)
(Continued)

(52) U.S. Cl.
CPC ............. *F04D 29/38* (2013.01); *F04D 13/04* (2013.01); *F01D 5/14* (2013.01); *F01D 5/30* (2013.01)

(58) Field of Classification Search
CPC . F04D 29/34; F04D 29/38; F01D 5/14; F01D 5/16; F01D 5/30; F01D 5/32
See application file for complete search history.

(56) References Cited

U.S. PATENT DOCUMENTS

| 2011/0206530 A1* | 8/2011 | Fabre | F01D 5/3092 |
| | | | 416/229 R |
| 2016/0339516 A1* | 11/2016 | Xu | F01D 5/186 |
| 2017/0107832 A1* | 4/2017 | Roberts | F01D 5/3061 |

FOREIGN PATENT DOCUMENTS

| CN | 105928676 A | 9/2016 | |
| EP | 921274 A2 * | 6/1999 | ............... F01D 5/10 |

(Continued)

OTHER PUBLICATIONS

International Search Report issued in International Application No. PCT/FR2019/050297, dated Jun. 13, 2019 (2 pages).
(Continued)

*Primary Examiner* — Sabbir Hasan
*Assistant Examiner* — Jackson N Gillenwaters
(74) *Attorney, Agent, or Firm* — Bookoff McAndrews, PLLC

(57) ABSTRACT

A rotor for a turbomachine includes a disc and a plurality of blades fixed to the disc. Each blade of the plurality of blades is fixed to the disc via a lattice structure configured so that a tensile force applied to the lattice structure induces a change in the angle of incidence of the blade. The blades and the lattice structures are configured so that: (i) when the rotor is stationary, the distribution of the angles of incidence of the blades around the disc is aperiodic, and (ii) when the rotor is rotating at a predetermined rotational speed, the angles of incidence of the blades are identical.

10 Claims, 2 Drawing Sheets

(51) Int. Cl.
    *F01D 5/14*     (2006.01)
    *F01D 5/30*     (2006.01)

(56) References Cited

FOREIGN PATENT DOCUMENTS

| EP | 2997345 B1 | 6/2017 |
|---|---|---|
| JP | 2003270081 A | 9/2003 |
| WO | WO 2014184468 A1 | 11/2014 |

OTHER PUBLICATIONS

Search Report issued in French Application No. 1851432, dated Oct. 4, 2018 (2 pages).

"Multifunctional Periodic Cellular Metals," H.N.G. Wadley, Phil. Trans. R. Soc. A 2006 364 31-68 (DOI: 10.1098/rsta.2005.1697), published Dec. 2, 2005 (38 pages).

"Design and Development of Cellular Structures for Additive Manufacturing," N.P. Biranchi, thesis, National Institute of Technology Rourkela, Jul. 2015 (10 pages).

\* cited by examiner

ROTOR FOR TURBINE ENGINE AND TURBINE ENGINE COMPRISING THIS ROTOR

CROSS-REFERENCE TO RELATED APPLICATIONS

This application is the U.S. national phase entry under 35 U.S.C. § 371 of International Application No. PCT/FR2019/050297, filed on Feb. 12, 2019, which claims priority to French Patent Application No. 1851432, filed on Feb. 20, 2018.

FIELD OF THE INVENTION

The present disclosure relates to a rotor for a turbomachine and a turbomachine comprising this rotor.

TECHNOLOGICAL BACKGROUND

In the field of turbomachines, in particular aeronautical or aerospace turbomachines, the search for the best possible performance at the lowest cost is a constant concern for the manufacturers.

With a view to obtaining the best possible performance, the aerodynamic or hydraulic profile of the blades of the rotor of the turbomachine is most often designed to be optimal at a particular operating point of the turbomachine, which operating point is generally a nominal operating point of the turbomachine.

In order to ensure the structural integrity of the turbomachine, the dynamic loads to which the turbomachine is subjected at this nominal operating point are studied very carefully, in order to make sure that there is no natural frequency of the turbomachine which could be excited at this nominal operating point.

However, in actual use, the turbomachine must go through a speed rise phase between the complete stop and the nominal operating point.

So far, it has proven extremely difficult, and often even impossible, to ensure that no natural frequency of the turbomachine exists between the complete stop and the nominal operating point. In practice, the turbomachine must therefore be allowed to undergo very briefly, during this speed rise phase, vibratory excitations related to the passage through one or several natural frequencies of the turbomachine. To make sure that the structural integrity of the turbomachine is not compromised by these vibratory excitations, partial tests, for example of the "ping-test" and/or forced response type, and operating tests of the complete turbomachine, must be carried out. These tests are very costly and time consuming, at least because they require the use of dedicated test stands.

There is therefore a real need for a new type of turbomachine that allows limiting the number of tests mentioned above, or even avoiding them entirely.

PRESENTATION OF THE INVENTION

To this end, the present disclosure relates to a rotor for a turbomachine comprising:
a disc able to be mounted on a shaft of the turbomachine; and
a plurality of blades fixed to the disc,
in which:
each blade of the plurality of blades is fixed to the disc via a lattice structure configured so that a tensile force applied to the lattice structure induces a change in the angle of incidence of the blade; and
the blades and the lattice structures are configured so that, when the rotor is stationary, the distribution of the angles of incidence of the blades around the disc is aperiodic.

The fact that the distribution of the angles of incidence of the blades around the disc is aperiodic when the rotor is stationary detunes the structure made up of the disc and the blades and thus tends to reduce the number of critical natural modes, excitable by weak energy levels. Thus, the number of vibratory excitation phases through which the turbomachine passes during its speed rise phase and the amplitude of the corresponding dynamic responses can be reduced, thereby reducing accordingly the number of tests to be carried out to ensure the structural integrity of the turbomachine. It is even possible that no natural frequency of the rotor exists during this speed rise phase, in which case no such test is to be carried out. The total cost of the rotor and of the turbomachine is therefore reduced.

It will also be noted that, due to the particular configuration of the lattice structures, the change in the angle of incidence of the blades takes place by itself, thanks to the centrifugal force due to the rotational speed of the rotor, as this rotational speed increases. There is therefore no need to provide for a mechanical control system for the angle of incidence of the blades. In addition, the angle of incidence of the blades being directly related to the rotational speed of the rotor, it is not necessary to provide for an additional servo-control system to control the rotational speed of the rotor as a function of the desired operating point of the turbomachine. This results in a gain in cost and simplicity of the turbomachine, and also a gain in reliability, since the number of systems to be provided in the turbomachine is lower. This is particularly advantageous when the turbomachine is a cryogenic propellant turbopump or a pump for a cryogenic propellant turbopump.

In some embodiments, the blades and the lattice structures are configured such that, when the rotor is stationary, the angles of incidence of the blades are set to a value chosen among two predetermined values.

In some embodiments, the blades and the lattice structures are configured so that, when the rotor is stationary, the angles of incidence of the blades are set to a value chosen among three predetermined values.

The number of possible angles of incidence being limited, the manufacture of the rotor is simplified.

In some embodiments, the blades and the lattice structures are configured so that, when the rotor is stationary, the angles of incidence of the blades are all different from each other.

In this way, the rotor does not have any symmetry that could lead to the appearance of a natural frequency of the turbomachine attributable to the blades. It is therefore even easier to make sure that no natural frequency of the turbomachine exists during the speed rise phase.

In some embodiments, the blades and the lattice structures are configured so that, when the rotor is rotating at a predetermined rotational speed, the angles of incidence of the blades are identical.

The fact that the angles of incidence of the blades are identical to the predetermined rotational speed allows achieving optimum performance at this predetermined rotational speed, which can be chosen to correspond to a nominal operating point of the turbomachine.

In some embodiments, the rotor is manufactured in one piece by additive manufacturing.

This makes it possible to reduce the number of operations necessary for the manufacture of the rotor, which is economically and industrially interesting.

In some embodiments, the rotor is manufactured in one piece by powder bed melting of a single metal alloy.

This allows simplifying the design and the implementation of the manufacture of the rotor.

The present disclosure also relates to a turbomachine comprising the turbomachine rotor described above.

The turbomachine may be a turbine for a cryogenic propellant turbopump or a pump for a cryogenic propellant turbopump.

The turbomachine may be a turbine or a compressor for a turbojet engine or a turboprop.

BRIEF DESCRIPTION OF THE DRAWINGS

The invention and its advantages will be better understood upon reading the following detailed description of embodiments of the invention given by way of non-limiting examples. This description refers to the appended drawings, in which.

DETAILED DESCRIPTION OF THE INVENTION

One embodiment of a turbomachine comprising a rotor will be described with reference to FIGS. 1 to 3.

Figure 1:
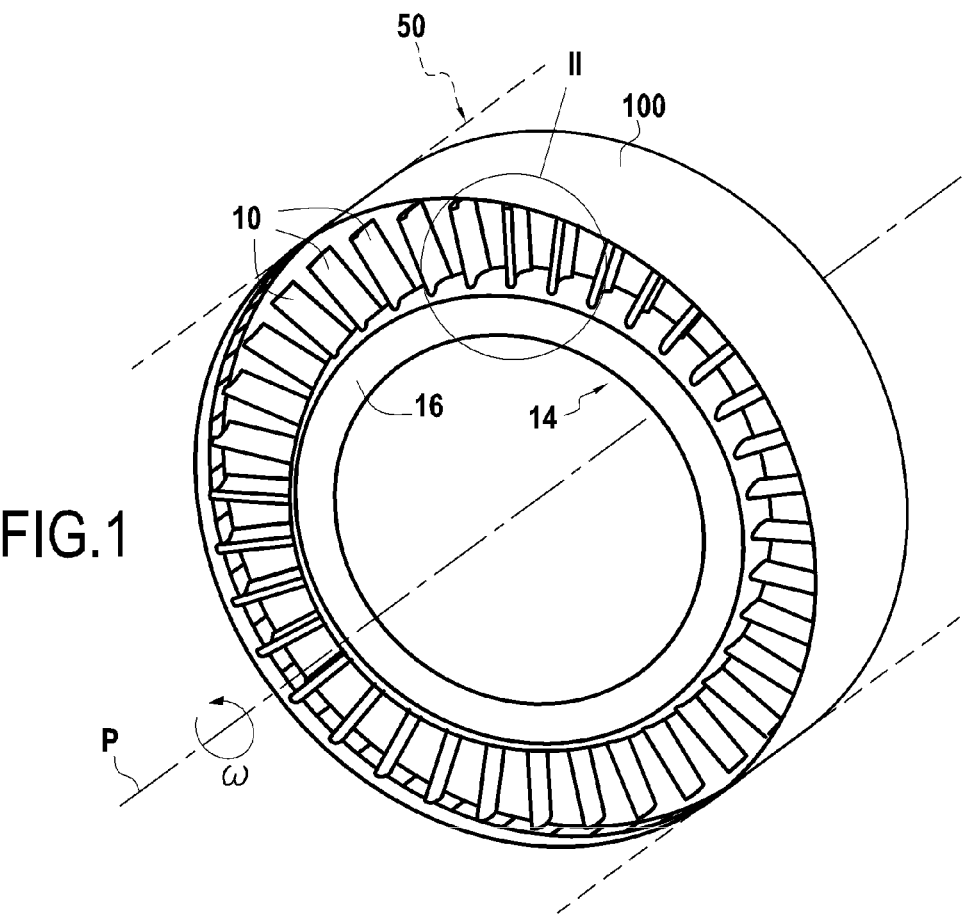
FIG. 1 is a perspective view of a turbomachine comprising a rotor.

FIG. 1 represents in perspective a turbomachine 50. In a known manner, the turbomachine 50 comprises a casing 100 and a rotor 14 disposed inside the casing 100. The rotor 14 comprises a disc 16 able to be mounted on a shaft (not represented) of the turbomachine 50, so that the disc 16 (and consequently the rotor 14) can rotate at a rotational speed w about a main axis P of the turbomachine 50.

In a known manner, the rotor 14 also comprises a plurality of blades 10 fixed to the disc 16, typically along the entire circumference of the disc 16. As a result, when the rotor 14 is rotating about the main axis P, an exchange of energy occurs between the rotor 14 on the one hand, and a working fluid flowing within the turbomachine 50 in a flow direction D on the other hand. Depending on the direction of this energy exchange, the turbomachine 50 provides energy to the working fluid or receives energy from the working fluid. It is here specified that, within the meaning of the present disclosure, the term "turbomachine" encompasses both the turbomachines providing energy to a working fluid (such as the pumps or the compressors) and the turbomachines receiving energy from a working fluid (such as the turbines). It is also specified here that the term "fluid" encompasses any type of fluid, including a gas or a mixture of gases. The turbomachine 50 can in particular be a turbine for a cryogenic propellant turbopump, or a pump for a cryogenic propellant turbopump, or a turbine or a compressor for a turbojet engine or a turboprop.

Each blade 10 is fixed to the disc 16 via a lattice structure 13. The lattice structures are known per se. It is only recalled here that a lattice structure is a structural element, often metallic, which comprises a lattice network, which network is obtained by periodic repetition of one or several patterns. These lattice structures make it possible to confer particular mechanical properties, by their preferred orientations (local anisotropies), and have good resistance to damage.

The methods for manufacturing lattice structures are known per se. In particular, manufacturing methods by folding or weaving are known. Reference may for example be made to the document «Multifunctional periodic cellular metals», H. N. G. Wadley, Phil. Trans. R. Soc. A 2006 364 31-68 (DOI: 10.1098/rsta.2005.1697). The lattice structures can also be manufactured by additive manufacturing methods. Reference may be made, for example, to the work "Cellular Design for Laser Freeform Fabrication", O. Rehme, Cuvillier Verlag, 2010 (ISBN: 9783869552736), or to the document "Design and Development of Cellular Structure for Additive Manufacturing", N. P. Biranchi, thesis, National Institute of Technology Rourkela, 2015.

Each lattice structure 13 of the rotor 14 is configured so that a tensile force applied to the lattice structure 13 induces a change in the angle of incidence of the corresponding blade 10. It is recalled that, in a turbomachine, the angle of incidence of a blade is the angle between the aerodynamic or hydrodynamic profile of the blade and the flow direction of the working fluid within the turbomachine. In the present case, the angle of incidence (noted below as θ) of the blade 10 is therefore the angle between the profile of the blade 10 and the flow direction D.

The lattice structures capable of transforming a tensile force into an angle change are known per se.

Figure 3A:
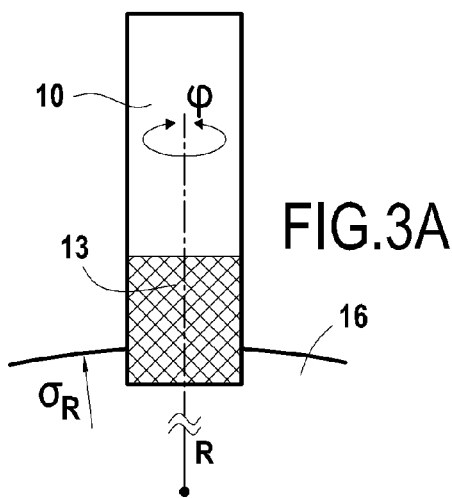
FIG. 3A is a view schematically illustrating the configuration of a lattice structure present in the rotor.

FIG. 3A schematically illustrates the configuration of a lattice structure 13. The lattice structure 13 is fixed at its end proximal to the disc 16, and at its distal end to a blade 10, so that, as indicated above, the blade 10 is fixed to the disc 16 via the lattice structure 13. When the disc 16 is rotating about the main axis P, the proximal end undergoes a tensile force $\sigma_R$ due to the centrifugal force exerted on the disc 16, which tensile force $\sigma_R$ is proportional to the square of the rotational speed ω of the disc 16 (that is to say $\sigma_R$ is proportional to $\omega^2$). Thanks to the configuration of the lattice structure 13, due to the tensile force $\sigma_R$, the distal end undergoes a rotation of angle φ. This rotation occurs most often about the axis R connecting the main axis P to the lattice structure 13. In any case, due to this rotation, the angle of incidence θ of the blade 10 is modified.

Figure 3B:
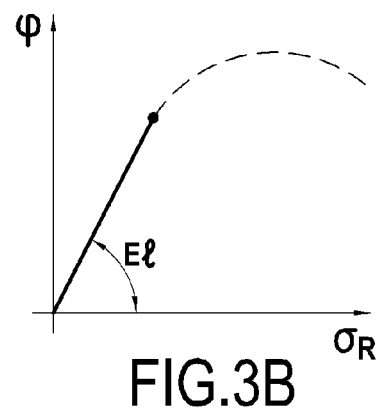
FIG. 3B is a graph schematically representing the relationship between a tensile force applied to the lattice structure of FIG. 3A and the angle of rotation induced by this tensile force.

As known for the lattice structures of the type described here, the rotation angle φ is all the greater as the tensile force $\sigma_R$ is high, as represented in FIG. 3B. In addition, as represented in FIG. 3B, there is generally a range of tensile force $\sigma_R$ (represented in solid lines on the graph of FIG. 3B) in which the rotation angle φ is proportional to the tensile force $\sigma_R$. The coefficient of proportionality (also known as "stiffness") is noted here $E\ell$.

The blades and the lattice structures of the rotor 14 are configured so that, when the rotor 14 is stationary (in other words when ω=0), the distribution of the angles of incidence of the blades around the disc 16 is aperiodic. Within the meaning of the present disclosure, the fact that the distribution of the angles of incidence of the blades around the disc 16 is aperiodic means that, when the N blades 10-1, . . . , 10-N of the disc 16 are considered successively while traveling the circumference of the disc 16 in a given direction, the sequence θ1, ..., θN of the angles of incidence of each considered blade is not a periodic sequence. Thus, if, when the rotor 14 is stationary, all the blades have the same angle of incidence, or all the blades have alternately two distinct angles of incidence θA, θB, the distribution of the angles of incidence of the blades around the disc 16 is not aperiodic. Conversely, by way of illustration, if the disc 16 has five blades 10-A, 10-B, 10-C, 10-D, 10-E having angles of incidence θA, θB, θC, θD, θE when the rotor 14 is stationary with θA=θC and θA, θB, θD, θE all distinct from each other, then the distribution of the angles of incidence of the blades 10-A, 10-B, 10-C, 10-D, 10-E around of disc 16 is aperiodic.

The fact that the distribution of the angles of incidence of the blades 10-1, ..., 10-N around the disc 16 is aperiodic when the rotor is stationary tends to reduce the number of critical natural modes of the turbomachine 50, which can be excited by low levels of energy. Thus, the number of vibratory excitation phases through which the turbomachine 50 passes during its speed rise phase can be reduced, thereby reducing accordingly the number of tests to be carried out to ensure the structural integrity of the turbomachine 50. The total cost of the rotor 14 and of the turbomachine 50 is therefore reduced.

Note that the angle of incidence of each blade 10-1, ..., 10-N when the rotor 14 is stationary can be modified by changing the structure of the network of the corresponding lattice structure 13-1, ..., 13-N, the stiffness Eℓ of the corresponding lattice structure 13-1, ..., 13-N, the position of the blade 10-1 ..., 10-N relative to the corresponding lattice structure 13-1, ..., 13-N, the spatial orientation of the corresponding lattice structure 13-1, ..., 13-N, or a combination of these quantities.

In some embodiments, the blades and the lattice structures of the rotor 14 are configured so that, when the rotor 14 is stationary, the angles of incidence of the blades are set to a value chosen from two or three predetermined values, provided that the distribution of the angles of incidence of the blades around the disc 16 is always aperiodic. The number of possible angles of incidence being limited, the manufacture of the rotor 14 is simplified.

In other embodiments, the blades and the lattice structures of the rotor 14 are configured such that, when the rotor 14 is stationary, the angles of incidence of the blades are all different from each other.

Figure 2A:
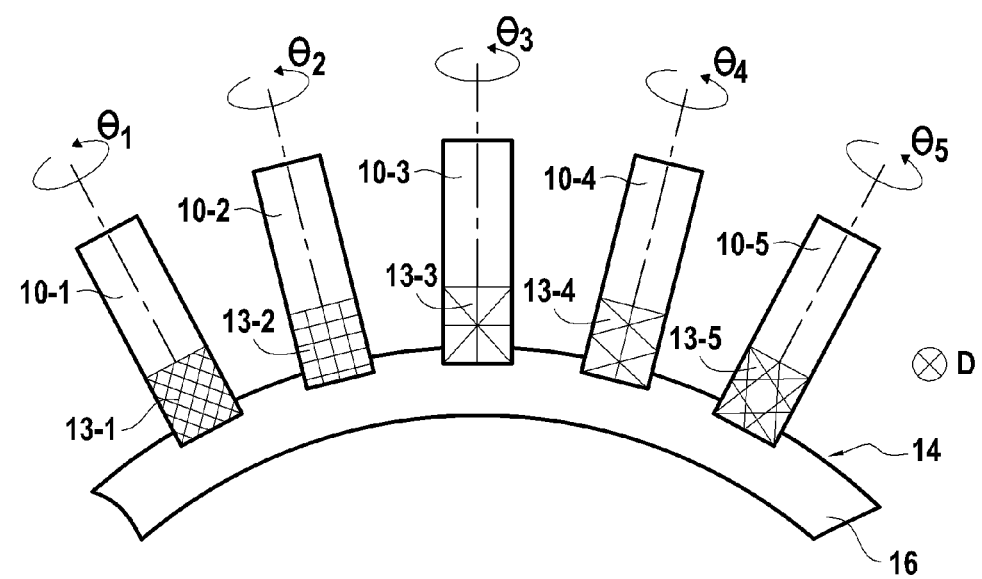
FIG. 2A is a front view of detail II of FIG. 1 when the turbomachine is stopped and the rotor is stationary.
Figure 2B:
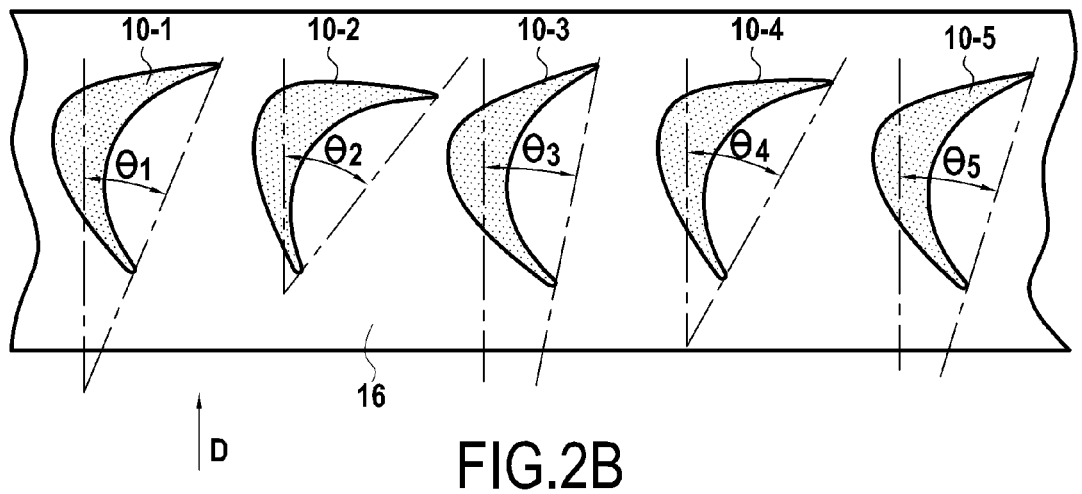
FIG. 2B is a top view of FIG. 2A.

FIGS. 2A and 2B schematically illustrate such an embodiment. Thus, in these figures, there are represented five blades 10-1, 10-2, 10-3, 10-4, 10-5 each fixed to the disc 16 via a lattice structure 13-1, 13-2, 13-3, 13-4, 13-5. When the rotor 14 is stationary (in other words when ω=0), the angles of incidence θ1, θ2, θ3, θ4, θ5 of the blades 10-1, 10-2, 10-3, 10-4, 10-5 are all different from each other. It goes without saying that the rotor 14 can comprise any number of blades, this number often being in practice much greater than five. In some embodiments, the stiffnesses Eℓ of the lattice structures 13-1, 13-2, 13-3, 13-4, 13-5 can all be different from each other.

Figure 2C:
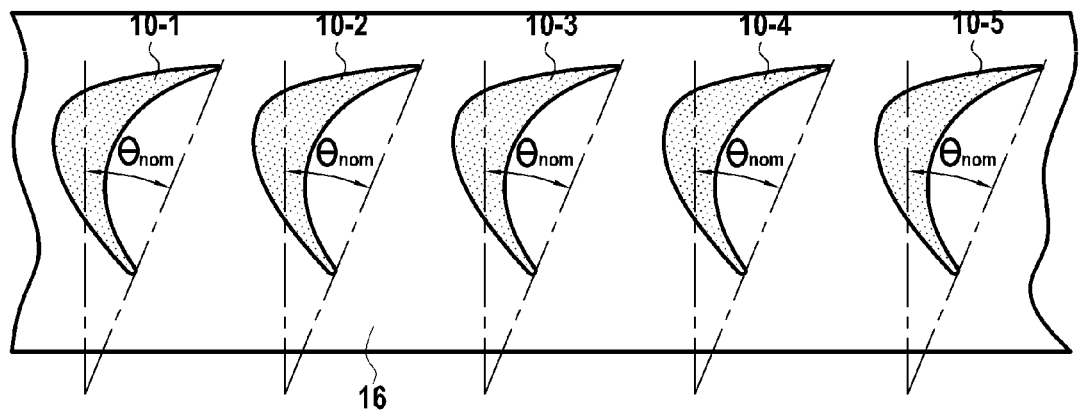
FIG. 2C is a view similar to FIG. 2B when the turbomachine is in operation and the rotor is rotating at a predetermined rotational speed.

In the embodiments described above, the blades and the lattice structures of the rotor 14 can be configured so that, as represented in FIG. 2C, when the rotor 14 is rotating at a predetermined rotational speed ω, the angles of incidence of the blades are identical, that is to say all equal to a predetermined value θnom. Thus, at the predetermined rotational speed ω, the flow of the working fluid is homogeneous and the performance is optimal.

In some embodiments, the blades and the lattice structures of the rotor 14 are configured so that no natural frequency of the turbomachine 50 exists at a rotational speed lower than the predetermined rotational speed ω. The predetermined rotational speed ω can be chosen to correspond to a particular operating point of the turbomachine 50, which is for example a nominal operating point of the turbomachine 50. The predetermined value θnom can be chosen to ensure optimum performance at this working point.

In the embodiments described above, all of the blades 10 of the rotor 14 are fixed to the disc 16 via a lattice structure 13. However, in some embodiments, some blades of the rotor 14 may not be fixed to the disc 16 via a lattice structure, as long as the blades which are fixed to the disc 16 via a lattice structure are such that, when the rotor 14 is stationary, the distribution of the angles of incidence of these blades around the disc 16 is aperiodic.

The rotor 14 can be manufactured in one piece by additive manufacturing. When the rotor 14 is manufactured in one piece by additive manufacturing, the impact of the lattice structures 13 on the total mass of the rotor 14 is reduced.

In some embodiments, the rotor 14 is manufactured in one piece by powder bed melting, preferably by powder bed melting of a single metal alloy. The methods of additive manufacturing by powder bed melting are known per se. It may for example be a selective laser melting (SLM), a direct metal laser sintering (DLMS), and a layer beam melting (LBM), of an electron beam melting (EBM), or derived methods.

In some embodiments, the rotor 14 is manufactured in one piece by selective laser sintering. The selective laser sintering (SLS) methods are known per se. For example, the rotor 14 is manufactured in one piece by selective laser sintering of a single metal alloy in powder form.

By manufacturing the rotor 14 in one piece by additive manufacturing, it is no longer necessary to individually fix the blades 10 to the disc 16 as in the conventional rotors. The number of operations necessary for its manufacture is therefore reduced, which is economically and industrially interesting. Preferably, the lattices of the lattice structures 13 are self-supporting, that is to say achievable by additive manufacturing without it being necessary to provide for supports under the lattices (in other words, during additive manufacturing, the lattices are themselves used as a support). In this case, the number of operations necessary for the manufacture of the rotor 14 is further reduced, since there is no need to remove supports after the manufacture of the rotor 14.

The fact of manufacturing the entire rotor 14 by a powder bed melting of a single metal alloy allows simplifying the design and the implementation of the manufacture of the rotor 14, in particular because it is not necessary to take into account the differences in mechanical properties and melting points of different metal alloys.

The metal alloy can be any alloy suitable for making a rotor for a turbomachine. For example, the metal alloy is a steel, a stainless steel, a nickel-based alloy (Ni), for example an alloy of the Inconel® type, or a titanium-based alloy (Ti), for example Ti6Al4V.

Although the present invention has been described with reference to specific exemplary embodiments, modifications can be made to these examples without departing from the general scope of the invention as defined by the claims. Particularly, individual characteristics of the different illustrated/mentioned embodiments can be combined in additional embodiments. Therefore, the description and the drawings should be considered in an illustrative rather than restrictive sense.

The invention claimed is:

1. A rotor for a turbomachine, comprising:
   a disc for mounting on a shaft of the turbomachine; and
   a plurality of blades fixed to the disc,
   each blade of the plurality of blades being fixed to the disc via a lattice structure configured so that a tensile force applied to the lattice structure induces a change in an angle of incidence of the blade; and
   the blades and the lattice structures being configured so that, in a stationary condition of the rotor, a distribution of the angles of of the blades around the disc is aperiodic.

2. The rotor as claimed in claim 1, wherein the blades and the lattice structures are configured so that, in the stationary condition of the rotor, the angles of incidence of the blades are each set to a value chosen among two predetermined values.

3. The rotor as claimed in claim 1, wherein the blades and the lattice structures are configured so that, in the stationary condition of the rotor, the angles of incidence of the blades are each set to a value chosen among three predetermined values.

4. The rotor as claimed in claim 1, wherein the blades and the lattice structures are configured so that, in a stationary condition of the rotor, the angles of incidence of the blades are all different from each other.

5. The rotor as claimed in claim 1, wherein the blades and the lattice structures are configured so that, when the rotor is rotating at a predetermined rotational speed, the angles of incidence of the blades are identical.

6. The rotor as claimed in claim 1, the rotor being manufactured in one piece by additive manufacturing.

7. The rotor as claimed in claim 6, the rotor being manufactured in one piece by a powder bed melting of a single metal alloy.

8. A turbomachine comprising a rotor as claimed in claim 1.

9. The turbomachine as claimed in claim 8, which turbomachine is a turbine for a cryogenic propellant turbopump or a pump for a cryogenic propellant turbopump.

10. The turbomachine as claimed in claim 8, which turbomachine is a turbine or a compressor for a turbojet engine or a turboprop.

* * * * *